(12) United States Patent
Hall, Jr. et al.

(10) Patent No.: US 6,437,914 B1
(45) Date of Patent: Aug. 20, 2002

(54) PROJECTION TELEVISIONS WITH HOLOGRAPHIC SCREENS HAVING CENTER TO EDGE VARIATIONS

(75) Inventors: Estill Thone Hall, Jr., Fishers; Wendy Rene Pfile, Indianapolis, both of IN (US)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/341,490

(22) PCT Filed: Jan. 29, 1998

(86) PCT No.: PCT/US98/01735

§ 371 (c)(1),
(2), (4) Date: Jul. 12, 1998

(87) PCT Pub. No.: WO98/33328

PCT Pub. Date: Jul. 30, 1998

Related U.S. Application Data

(60) Provisional application No. 60/036,179, filed on Jan. 29, 1997.

(51) Int. Cl.[7] ........................ G03B 21/60; G03B 21/56; G03B 5/32; H04N 5/72; H04N 5/74
(52) U.S. Cl. ........................ 359/457; 359/460; 359/15; 348/781; 348/832
(58) Field of Search ................................ 359/443, 460, 359/455, 456, 457, 16, 1; 353/20, 32; 348/41, 780, 781, 807, 832

(56) References Cited

U.S. PATENT DOCUMENTS

| | | | |
|---|---|---|---|
| 5,046,793 A | | 9/1991 | Hockley et al. ............... 359/12 |
| 5,206,761 A | | 4/1993 | Ogino ......................... 359/457 |
| 5,442,482 A | * | 8/1995 | Johnson et al. ............. 359/619 |
| 5,615,045 A | * | 3/1997 | Takuma et al. ............. 359/456 |
| 5,760,955 A | * | 6/1998 | Goldenberg et al. ........ 359/456 |
| 5,796,499 A | * | 8/1998 | Wenyon ....................... 359/15 |
| 5,889,612 A | * | 3/1999 | Van De Ven ................ 359/453 |
| 5,999,281 A | * | 12/1999 | Abbott et al. .................. 359/15 |

FOREIGN PATENT DOCUMENTS

| | | | |
|---|---|---|---|
| EP | 0349947 | 1/1990 | ............ G02B/5/02 |
| EP | 0479490 | 4/1992 | ............ G02B/5/32 |
| EP | 0629899 | 12/1994 | ............ G03B/21/62 |
| JP | 06-082625 | 3/1994 | ............ G02B/5/32 |
| WO | 95/34832 | 12/1995 | ............ G02B/5/32 |
| WO | 96/07953 | 3/1996 | ............ G03B/21/62 |

OTHER PUBLICATIONS

Patent Abstracts of Japan, vol. 18, No. 333, Jun. 23, 1994 & JP 06–082625.

* cited by examiner

*Primary Examiner*—Christopher Mahoney
(74) *Attorney, Agent, or Firm*—Joseph S. Tripoli; Joseph J. Laks; Harvey D. Fried

(57) ABSTRACT

An East-West switching transistor is coupled between a flyback transformer primary winding and a horizontal deflection output transistor circuit to control retrace energy to obtain an East-West modulation of the deflection current amplitude as required for East-West pincushion raster correction. A pair of series coupled first and second capacitors forming a capacitive voltage divider are coupled to a retrace resonant circuit that includes the deflection winding via a sampling switch, during a first half of a retrace interval, to produce a first ramping capacitor voltage in the first capacitor from a portion of a retrace pulse voltage. The first capacitor is coupled to an East-West pincushion raster correction current for producing a second ramping capacitor voltage in the first capacitor that ramps in an opposite direction. A comparator is responsive to the capacitor voltage for controlling a conduction interval of the East-West switching transistor.

10 Claims, 3 Drawing Sheets

PROJECTION TELEVISIONS WITH HOLOGRAPHIC SCREENS HAVING CENTER TO EDGE VARIATIONS

This application claims benefit of Provisional Application No. 60/036179 Filed Jan. 29, 1997.

BACKGROUND

1. Field of the Invention

This invention relates generally to the field of projection television receivers, and in particular to projection television receivers having screens providing significantly reduced color shift and/or significantly reduced cabinet depth.

2. Background Information

Color shift is defined as the change in the red/blue or green/blue ratio of a white image formed at the center of a projection screen by projected images from red, green and blue projection tubes, when viewed at different angles in the horizontal plane, by observations made at the peak brightness vertical viewing angle.

The color shift problem is caused by the need for at least three image projectors for respective images of different colors, for example, red, blue and green. A projection screen receives images from the at least three projectors on a first side and displays the images on a second side with controlled light dispersion of all the displayed images. One of the projectors, usually green and usually in the center of an array of projectors, has a first optical path in a substantially orthogonal orientation with the screen. At least two of the projectors, usually red and blue and usually positioned on opposite sides of the central green projector in the array, have respective optical paths converging toward the first optical path in a non orthogonal orientation defining angles of incidence. Color shift results from the non orthogonal relationship of the red and blue projectors, relative to the screen and to the green projector. As a result of the color shift, color tones may differ at every position on the screen. The condition in which the color tone difference is large is often referred to as poor white uniformity. The smaller the color shift, the better the white uniformity.

Color shift is denoted by a scale of numbers, in which lower numbers indicate less color shift and better white uniformity. In accordance with a common procedure, values for the red, green and blue luminance are measured at the screen center from a variety of horizontal viewing angles, typically from at least about −40° to +40°, to as much as about −60° to +60°, in 5° or 10° increments. The positive and negative angles represent horizontal viewing angles to the right and left of screen center, respectively. These measurements are taken at the peak vertical viewing angle. The red, green and blue data is normalized to unity at 0°. One or both of the following equations (I) and (II) are evaluated at each angle:

$$C(\Theta) = 20 \cdot \log_{10}\left(\frac{\text{red}(\Theta)}{\text{blue}(\Theta)}\right); \tag{I}$$

$$C(\Theta) = 20 \cdot \log_{10}\left(\frac{\text{green}(\Theta)}{\text{blue}(\Theta)}\right) \tag{II}$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ. The maximum of these values is the color shift of the screen.

In general, color shift-should be no larger than 5, nominally, on any commercially acceptable screen design. Other engineering and design constraints may sometimes require that the color shift be somewhat higher than 5, although such color shift performance is not desirable and usually results in a perceptibly inferior picture with poor white uniformity.

Screens for projection television receivers are generally manufactured by an extrusion process utilizing one or more patterned rollers to shape the surface of a thermoplastic sheet material. The configuration is generally an array of lenticular elements, also referred to as lenticules and lenslets. The lenticular elements may be formed on one or both sides of the same sheet material or on one side only of different sheets which can then be permanently combined as a laminated unit or otherwise mounted adjacent to one another so as to function as a laminated unit. In many designs, one of the surfaces of the screen is configured as a Fresnel lens to provide light diffusion. Prior art efforts to reduce color shift and improve white uniformity have focused exclusively on two aspects of the screen. One aspect is the shape and disposition of the lenticular elements. The other aspect is the extent to which the screen material, or portions thereof, are doped with light diffusing particles to control light diffusion. These efforts are exemplified by the following patent documents.

In U.S. Pat. Nos. 4,432,010 and 4,536,056, a projection screen includes a light-transmitting lenticular sheet having an input surface and an exit surface. The input surface is characterized by horizontally diffusing lenticular profiles having a ratio of a lenticulated depth Xv to a close-axis-curvature radius R1 (Xv/R1) which is within the range of 0.5 to 1.8. The profiles are elongated along the optical axis and form aspherical input lenticular lenses.

The use of a screen with a double sided lenticular lens is common. Such a screen has cylindrical entrance lenticular elements on an entrance surface of the screen, cylindrical lenticular elements formed on an exit surface of the screen and a light absorbing layer formed at the light non convergent part of the exit surface. The entrance and the exit lenticular elements each have the shape of a circle, ellipse or hyperbola represented by the following equation (III):

$$Z(x) = \frac{Cx^2}{1 + [1 - (K+1)C^2 x^2]^{\frac{1}{2}}} \tag{III}$$

wherein C is a main curvature and K is a conic constant.

Alternatively, the lenslets have a curve to which a term with a higher order than 2nd order has been added.

In screens making use of such a double sided lenticular lens, it has been proposed to specify the position relationship between the entrance lens and exit lens, or the lenticular elements forming the lenses. It has been taught, for example in U.S. Pat. No. 4,443,814, to position the entrance lens and exit lens in such a way that the lens surface of one lens is present at the focal point of the other lens. It has also been taught, for example in JP 58-59436, that the eccentricity of the entrance lens be substantially equal to a reciprocal of the refractive index of the material constituting the lenticular lens. It has further been taught, for example in U.S. Pat. No. 4,502,755, to combine two sheets of double-sided lenticular lenses in such a way that the optic axis planes of the respective lenticular lenses are at right angles with respect to one another, and to form such double sided lenticular lenses in such a way that the entrance lens and exit lens at the periphery of one of the lenses are asymmetric with respect to the optic axis. It is also taught, in U.S. Pat. No. 4,953,948, that the position of light convergence only at the valley of an entrance lens should be offset toward the viewing side from the surface of an exit lens so that the tolerance for misalignment of optic axes and the difference in thickness can be made larger or the color shift can be made smaller.

In addition to the various proposals for decreasing the color shift or white non uniformity, other proposals for improving projection screen performance are directed to brightening pictures and ensuring appropriate visual fields in both the horizontal and vertical directions. A summary of many such proposals can be found in U.S. Pat. No. 5,196,960, which itself teaches a double sided lenticular lens sheet comprising an entrance lens layer having an entrance lens, and an exit lens layer having an exit lens whose lens surface is formed at the light convergent point of the entrance lens, or in the vicinity thereof, wherein the entrance lens layer and the exit lens layer are each formed of a substantially transparent thermoplastic resin and at least the exit layer contains light diffusing fine particles and wherein a difference exists in the light diffusion properties between the entrance lens layer and the exit lens layer. A plurality of entrance lenses comprise a cylindrical lens. The exit lens is formed of a plurality of exit lens layers, each having a lens surface at the light convergent point of each lens of the entrance lens layer, or in the vicinity thereof. A light absorbing layer is also formed at the light non convergent part of the exit lens layer. This screen design is said to provide sufficient horizontal visual field angle, decreased color shift and a brighter picture, as well as ease of manufacture by extrusion processes.

Several additional brightness problems occur due to the nature of projection systems. One of the common performance issues of a projection television design is the relative difference in brightness between the screen edges and the screen center under comparable degrees of illumination. Typically the picture at the corners is not as bright as at the center of the picture. The difference in relative brightness occurs partly because the optical path is shorter from the projectors to the center of the screen than from the projectors to the edges of the screen. The difference also occurs partly because the projectors are generally oriented toward the center of the screen, their beams typically converging at the center. The projectors thus illuminate the edges and corners both with less light intensity (due to distance) and less directly than at the center.

One method for dealing with edge brightness is to use a fresnel lens behind the diffuse or lenticular panel of the screen. The fresnel lens is a collimating lens having a focal length equal to the axial distance between the collimating lens and the exit lens pupils of the projectors. The object is to redirect light rays diverging from the projectors such that the rays along the projection axis from each projection tube emerge from the screen parallel to the axis.

A fresnel lens is subdivided into ridges that are progressively more inclined toward the edges of the lens, having a slope substantially equal to the slope of a solid collimating lens, the specific angles of the ridges being chosen such that refraction at the air/glass (or air/plastic) interfaces at the surface of the lens bend the rays in the required direction. In particular, rays diverging from the center axis of the screen are bent inwardly toward the center axis to emerge parallel to the center axis. This requires progressively greater refraction at the edges of the screen and no refraction at the center.

It is known in a conventional projection screen to increase the focal length of the fresnel ridges proceeding outwardly from the center of the picture. Off-axis light rays at the screen edges are bent beyond parallel to the center axis, and are directed somewhat inwardly toward the center axis. This makes the edges of the picture appear brighter provided the screen is viewed along the center axis, but is not helpful for viewing from other positions.

Another brightness variation problem can occur in projection televisions in which a fresnel is arranged to direct light in the direction of a user viewing from a point above the center of the screen, for example in a projection television having a relatively low cabinet. This is accomplished by offsetting the centerline of the fresnel upwardly relative to the center of the screen. Although this can improve relative brightness, especially at the corners, the top of the screen also appears generally brighter than the bottom of the screen.

Despite many years of aggressive developments in projection screen design, the improvements have been incremental, at best. Moreover, there has been no success in surpassing certain benchmarks. The angle of incidence defined by the geometric arrangement of the image projectors, referred to as angle $\alpha$ herein, has generally been limited to the range of greater than 0° and less than or equal to about 10° or 11°. The size of the image projectors and/or their optics, makes angles of $\alpha$ close to 0° essentially impossible. In the range of the angles of $\alpha$ less than about 10° or 11°, the best color shift performance which has been achieved is about 5, as determined in accordance with equations (I) and (II). In the range of the angles of a greater than about 10° or 11°, the best color shift performance which has been achieved is not commercially acceptable. In fact, projection television receivers having angles of $\alpha$ greater than 10° or 11° are not known to have been marketed.

Small angles of a have a significant and undesirable consequence, namely a very large cabinet depth is needed to house a projection television receiver. The large depth is a direct result of the need to accommodate optical paths having small angles of incidence ($\alpha$). For a given size of the image projectors and optical elements, the angle of incidence can be reduced only by increasing the length of the optical path between the image projectors or their optics and the screen. Techniques for reducing the size of projection television cabinets generally rely on mirrors for folding long optical paths. The color shift success of such efforts is ultimately limited because there is a low limit to the range of possible angles of incidence.

Polaroid Corporation sells a photo polymer designated DMP-128®, which Polaroid Corporation can manufacture as a three dimensional hologram, using proprietary processes. The holographic manufacturing process is described, in part, in U.S. Pat No. 5,576,853. Holographic photo polymers are generally useful for recording photographic images by splitting coherent light into an illumination beam and a reference beam. The illumination beam irradiates the subject. The reflected beam from the subject and the reference beam, which bypasses the subject, irradiate the photo polymer medium, which contains a developable light sensitive photographic composition. The light waves of the two beams interfere, that is, by constructive and destructive interference they produce a standing wave pattern of sinusoidal peaks which locally expose the photographic composition, and nulls which do not locally expose the composition. When the photographic medium is developed, a corresponding interference pattern is recorded in the medium. By illuminating the medium with a coherent reference beam, the image of the subject is reproduced and can be viewed over a range of apparent angles.

The recorded interference pattern of a hologram representing a typical photographic subject is complex because light from all the illuminated points on the subject interfere with the reference beam at all points on the hologram. It would be possible by recording the image of a blank "subject" (effectively by interfering two reference beams), to make a blank hologram in which the interference pattern is more regular. In that case the interference pattern would resemble a diffraction grating but the pitch or resolution of the diffraction grating would be quite fine compared to the pitch of a projection screen having macro sized lenticular elements shaped to bend or refract light in a particular direction from rearward projection tubes.

A three dimensional holographic screen for a projection television was proposed -by Polaroid Corporation, as one of many suggestions made during efforts to establish a market for the DMP-128® photo polymer holographic product. The proposal was based on advantages which Polaroid Corporation expected in terms of higher brightness and resolution, lower manufacturing cost, lower weight, and resistance to the abrasion to which two-piece screens are subjected during shipping. Polaroid Corporation never proposed any particular holographic configuration for the volume holographic elements which might make up such a holographic projection television screen, and never even considered the problem of color shift in projection television screens of any type, holographic or otherwise.

Overall, despite years of intensive development to provide a projection television receiver having a screen with a color shift less than 5, even significantly less than 5, or having a color shift as low as 5 for angles of α even greater than 10° or 11°, there have been no advances in solving the color shift problem other than incremental changes in the shapes and positions of lenticular elements and diffusers in conventional projection screens. Moreover, despite suggestions that three dimensional holograms might be useful for projection screens, although for reasons having nothing to do with color shift, there has been no effort to provide projection televisions with three dimensional holographic screens. A long felt need for a projection television receiver having significantly improved color shift performance, which can also be built into a significantly smaller cabinet, has remained unsatisfied.

SUMMARY

A projection television receiver in accordance with the inventive arrangements taught herein provides such a significant improvement in color shift performance, measured in orders of magnitude, that a color shift of 2 or less can be achieved with projection television receivers having angles of incidence α in the range of less than 10° or 11°. Moreover, the color shift performance is so significant that commercially acceptable projection television receivers having angles of incidence up to about 30° can be provided, in much smaller cabinets. The color shift performance of such large α angle receivers is at least as good as conventional small α angle receivers, for example having a color shift of 5, and can be expected to approach or even reach values as low as about 2, as in the small α angle receivers.

These results are achieved by forsaking the extruded lens screen technology altogether. Instead, a projection television receiver in accordance with an inventive arrangement has a screen formed by a three dimensional hologram formed on a substrate, for example, a polyethylene film, such as Mylar®.

Such a three dimensional holographic screen was originally developed for its expected advantages in terms of higher brightness and resolution, and lower manufacturing cost, lower weight and resistance to abrasion to which two-piece screens are subjected, for example during shipping. The discovery of the color shift performance of the three dimensional holographic screen came about when testing to determine if the optical properties of the three dimensional screen would be at least as good as a conventional screen. The color shift performance of the three dimensional holographic screen, as measured by equations (I) and (II), was so unexpectedly low as to be shocking. The barriers which limited prior art improvements to incremental steps had been eliminated altogether. Moreover, smaller cabinets with projection geometry characterized by larger a angles of incidence can now be developed.

A projection television having the unexpected properties associated with three dimensional holographic screens, and in accordance with the inventive arrangements taught herein, comprises: at least three image projectors for respective images of different colors; a projection screen formed by a three dimensional hologram disposed on a substrate, the screen receiving images from the projectors on a first side and displaying the images on a second side with controlled light dispersion of all the displayed images; one of the projectors having a first optical path in a substantially orthogonal orientation with the screen and at least two of the projectors having respective optical paths converging toward the first optical path in a non orthogonal orientation defining angles of incidence; and, the three dimensional hologram representing a three dimensional array of lenticular elements having a configuration effective for reducing color shift in the displayed images, the screen having a color shift less than or equal to approximately 5 for all the angles of incidence in a range greater than 0° and less than or equal to approximately 30°, as determined by the maximum value obtained from at least one of the following expressions:

$$C(\Theta) = 20 \cdot \log_{10}\left(\frac{\text{red}(\Theta)}{\text{blue}(\Theta)}\right);$$

$$C(\Theta) = 20 \cdot \log_{10}\left(\frac{\text{green}(\Theta)}{\text{blue}(\Theta)}\right)$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ. The color shift of the screen can be expected to be less than 5, for example, less than or equal to approximately 4, 3 or even 2.

In terms of the known barrier at an angle of incidence of about 10° or 11°, the color shift of the screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°.

The screen further comprises a light transmissive reinforcing member, for example, of an acrylic material in a layer having a thickness in the range of approximately 2–4 mm. The substrate comprises a highly durable, transparent, water-repellent film, such as a polyethylene terephthalate resin film. The substrate can be a film having a thickness in the range of about 1–10 mils. A thickness of about 7 mils has been found to provide adequate support for the three dimensional hologram. The thickness of the film is not related to performance. The three dimensional hologram has a thickness in the range of not more than approximately 20 microns. The projection television may further comprise one or more mirrors between the image projectors and the screen.

According to an inventive aspect, a projection screen is specifically arranged to improve brightness and uniformity over a wide range of angles of incidence of the projection beams. This is accomplished using a holographic screen as described, having substantially higher gain proceeding toward the edges, backed by one or more linear fresnel panels having ridges that progressively vary in focal length from the center to the edges. The fresnel panel(s) of the screen also can have modestly different focal lengths between the bottom and top of the screen for optimizing screen, brightness and uniformity from the perspective of viewer located off the center axis of the screen.

DESCRIPTION OF THE PREFERRED EMBODIMENTS

Figure 1:
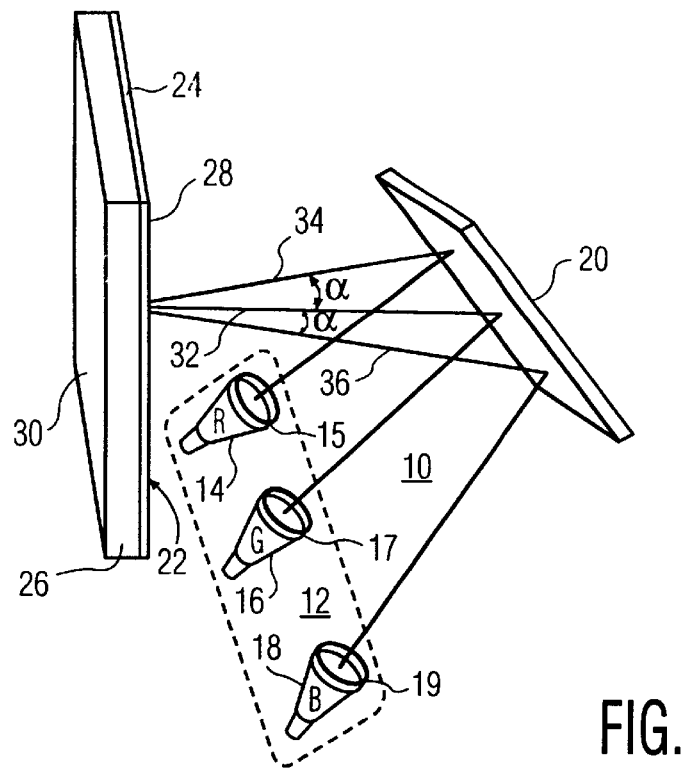
FIG. 1 is a diagrammatic representation of a projection television in accordance with the inventive arrangements taught herein.

A projection television receiver 10 is illustrated in FIG. 1. An array 12 of projection cathode ray tubes 14, 16 and 18 provide red, green and blue images respectively. The cathode ray tubes are provided with respective lenses 15, 17 and 19. The projected images are reflected by a mirror 20 onto a projection screen 22. Additional mirrors can also be utilized, depending on the particular geometry of the optical paths. The green cathode ray tube 16 projects the green image along an optical path 32, which in this example is oriented substantially orthogonal to screen 22. In other words, the centerline of the optical path is at right angles to the screen. The red and blue cathode ray tubes have respective optical paths 34 and 36, which converge toward the first optical path 32 in a non orthogonal orientation defining angles of incidence α. The angles of incidence introduce the problem of color shift.

The screen 22 comprises a three dimensional hologram 26 disposed on a substrate 24. Hologram 26 is a print of a master hologram substantially forming a diffraction pattern that manages the distribution of light energy from the three projectors 14, 16, 18, and can be made variable across the width and/or height of the screen. In a preferred arrangement, the hologram is a "center only" hologram that tends to reorient incident light. The screen receives images from the projectors on a first, entrance surface side 28 and displays the images on a second, exit surface side 30, with controlled light dispersion of all the displayed images. The substrate is preferably a highly durable, transparent, water-repellent film, such as a polyethylene terephthalate resin film. One such film is available from E. I. du Pont de Nemours & Co. under the trademark Mylar®. The film substrate has a thickness in the range of about 1–10 mils, equivalent to about 0.001–0.01 inches or about 25.4–254 microns. A film having a thickness of about 7 mils has been found to provide adequate support for the three dimensional hologram disposed thereon. The thickness of the film does not affect screen performance in general or color shift performance in particular, and films of different thickness may be utilized. The three dimensional hologram 26 has a thickness of not more than approximately 20 microns.

Three dimensional holographic screens are available from at least two sources. Polaroid Corporation utilizes a proprietary, wet chemical process to form three dimensional holograms in its DMP-128 photo polymer material. The process includes forming a diffractive holographic pattern in the photo polymer material, which pattern can include variations in screen gain across the range of horizontal and/or vertical viewing angles. A master hologram can be prepared by exposing photo polymer holographic media to coherent light including a reference beam and a beam reflected from a planar pattern having light-to-dark variations corresponding to the desired variation in gain.

A preferred embodiment of the three dimensional holographic screens used in the projection television receivers described and claimed herein were manufactured by the Polaroid Corporation wet chemical process, in accordance with the following performance specifications:

Horizontal half viewing angle: $38°\pm3°$,
Vertical half viewing angle: $10°\pm1°$,
Screen gain: $\geq 8$,
Color shift: $\leq 3$, where the horizontal and vertical viewing angles are measured conventionally, screen gain is the quotient of light intensity directed from the source toward the rear of the viewing surface, and light intensity from the front of the viewing surface toward the viewer, measured orthogonal to the screen, and color shift is measured as described above. The extraordinary color shift performance of the three dimensional holographic projection screen was, as explained in the Summary, wholly unexpected.

Figure 2:
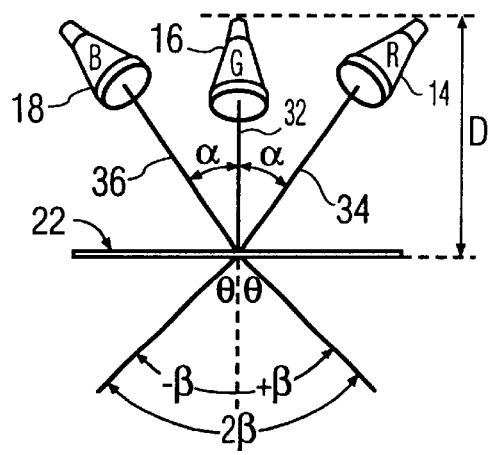
FIG. 2 is a simplified diagram of projection television geometry useful for explaining the inventive arrangements.

FIG. 2 is a simplified projection television diagram, omitting the mirror and lenses, for explaining color shift performance. The optical axes 34 and 36 of the red and blue cathode ray tubes 14 and 18 are aligned symmetrically at angles of incidence α with respect to the optical axis 32 of the green cathode ray tube 16. The minimum depth D of a cabinet is determined by the distance between the screen 22 and the rear edges of the cathode ray tubes. It will be appreciated that if the angle α is to become smaller, the cathode tubes must be placed closer together and/or must be spaced further from the screen to provide clearance for the tubes. At a sufficiently small angle α, such interference cannot be avoided. This undesirably increases the minimum depth D of a cabinet. Conversely, as the angle a gets larger, the cathode ray tubes can be moved closer to the screen 22, reducing the minimum depth D of a cabinet.

On the viewing side of the screen 22, two horizontal half viewing angles are designated $-\beta$ and $+\beta$. Together, a total horizontal viewing angle of $2\beta$ is defined. The half viewing angles may typically range from $\pm40°$ to $\pm60°$. Within each half angle are a plurality of specific angles θ, at which color shift can be measured and determined, in accordance with equations (I) and (II) explained above.

In terms of the known barrier at an angle of incidence of about 10° or 11°, the color shift of the three dimensional holographic screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°. It is expected that a color shift of less than or equal to approximately 2, as in the first subrange, can also be achieved in the second subrange of larger angles of incidence.

Figure 3:
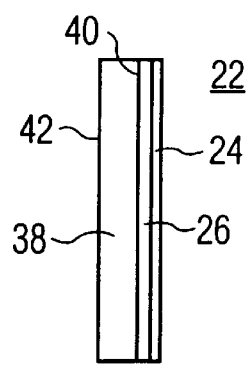
FIG. 3 is a side elevation of a reinforced projection screen according to the inventive arrangements.

With reference to FIG. 3, the substrate 24 comprises a transparent film, such as Mylar®, as described above. The photo polymer material from which the three dimensional hologram 26 is formed is supported on the film layer 24. A suitable photo polymer material is DMP-128®.

The screen 22 may further comprise a light transmissive reinforcing member 38, for example, of an acrylic material, such as polymethylmethacrylate (PMMA). Polycarbonate materials can also be used. The reinforcing member 38 is presently a layer having a thickness in the range of approximately 2–4 mm. The screen 22 and the reinforcing member are adhered to one another throughout the mutual boundary 40 of the holographic layer 26 and the reinforcing member 38. Adhesive, radiation and/or thermal bonding techniques may be utilized. The surface 42 of the reinforcing layer may also be treated, for example by one or more of the following: tinting, anti-glare coatings and anti-scratch coatings.

Figure 4:
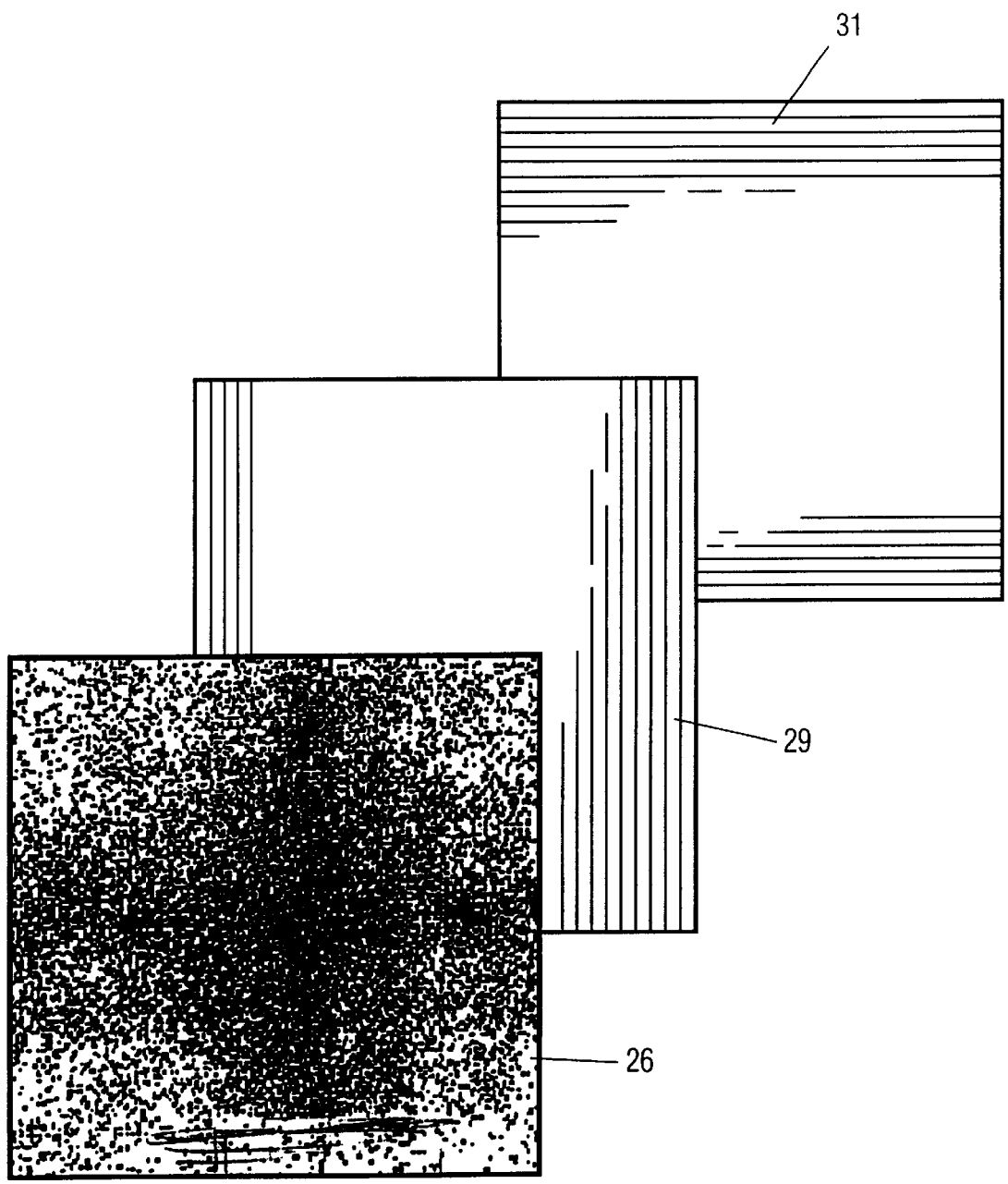
FIG. 4 is a schematic representation of an alternative embodiment of a projection screen with superimposed linear fresnels and a hologram.

Various surfaces of the screen and/or its constituent layers may be provided with other optical lenses or lenticular arrays to control aspects of the projection screen bearing on performance characteristics other than color shift performance. These aspects can be made complementary with the characteristics of the holographic screen. FIG. 4 illustrates a first such variation wherein a circular holographic element 26 is superimposed or stacked with linear fresnel elements. In this embodiment, a horizontally active (vertically lenticular) fresnel 29 and a vertically active (horizontally lenticular) fresnel 31 are provided. Stacking allows the separate handling of vertical and horizontal collimation, and linear fresnels can be less expensive than circular ones.

Figure 5:
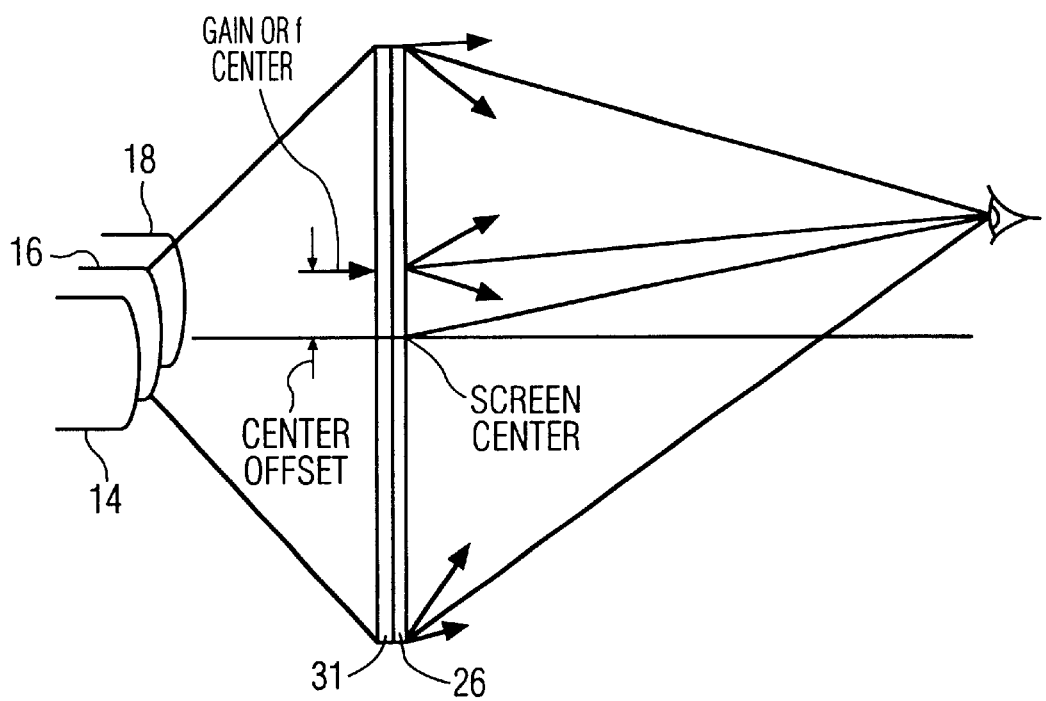
FIG. 5 is a schematic representation of the effects of variations in holographic gain and fresnel focal length across a length or width of the screen, together with offsetting of the centers of gain and/or focal length variation.

Moreover, one or more linear fresnels provide an additional degree of freedom as illustrated in FIG. 5. It is desirable that the brightness of the display be as uniform as possible from all angles and at all points on the screen. A circular fresnel (not shown) thus can be centered on the screen and provided with a focal length equal to the distance between the exit pupil of the projection tubes and the screen. The fresnel orients light from the projection tubes perpendicular to the screen surface regardless of the angle at which the light arrives. This is shown in an approximate way by the thin lens equation:

$$\frac{1}{s} + \frac{1}{s'} = \frac{1}{f}$$

where s is the distance from the exit pupil to the screen; s' is the distance from the screen to the apparent "image"; and f is the focal length of the fresnel. If s=f, then s' goes to infinity, and an image apparently at infinity implies that the light rays leaving the screen are parallel.

It is known to provide a continuous variation in focal length from the center of the screen to the edges as a means to improve the brightness of the screen edges compared to the center, effectively by directing light at the edges of the screen more inwardly toward the center axis of the screen. In the thin lens equation, for example, if one posits a variable δ representing the incremental difference in focal length between two points on a fresnel (e.g., from the center toward the edge) and substitutes f+δ for f, the following solution shows the effect on f, the distance to the apparent image:

$$\frac{1}{f+\delta} = \frac{1}{s'} + \frac{1}{f}$$

$$s' = \frac{-(-f^2 + f \cdot \delta)}{\delta}$$

Figure 6:
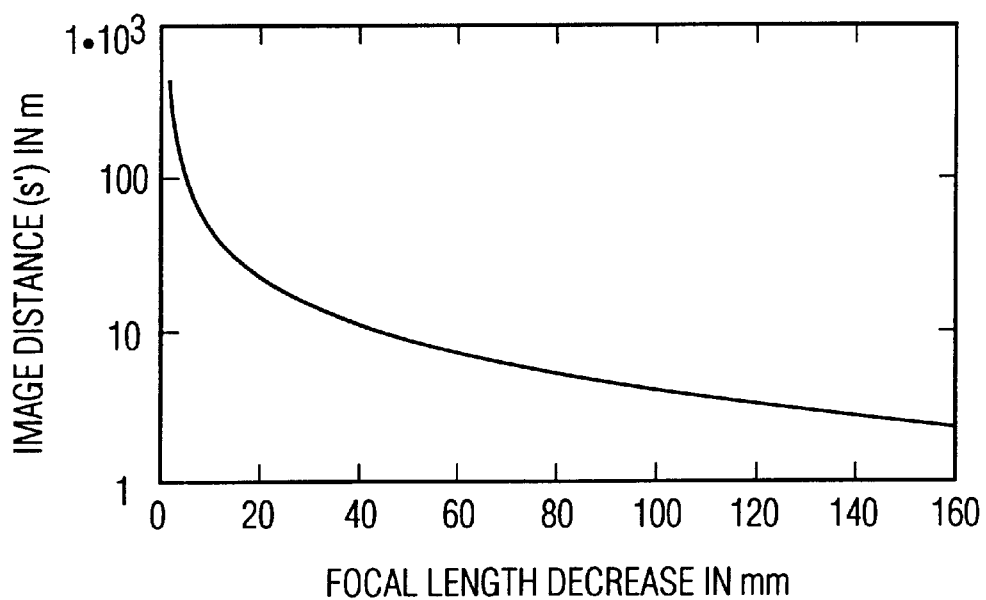
FIG. 6 is a graphical representation of the effect of variations in the focal length of the linear fresnel lens on the apparent image.

This function is illustrated in FIG. 6, and shows that the apparent image comes closer as the focal length decreases.

In the case of a circular fresnel, the amount of correction can be optimized in all directions outwardly from the center of the screen. However, the aspect ratio of a screen is generally wider in the horizontal direction (4:3 or 16:9), such that larger correction is needed to optimize for the horizontal screen edges. With a linear fresnel element and a horizontal fresnel element, all of the power of the vertical and horizontal elements can be used to move the light inwardly toward the axis in the respective vertical or horizontal plane. The focal length variation in the vertical and horizontal directions from the screen to the edges can be made at different rates. The result is improved minor axis and corner illumination as compared to a circular fresnel.

Referring to FIG. 5, a further degree of freedom with linear fresnels is that the vertical and horizontal directions can be independently centered. Generally it is advantageous that the screen appearance be symmetrical across the range of horizontal viewing angles. As to vertical, however, it may be desirable to have somewhat of an up-angle or down-angle, for example in a floor or ceiling mounted projection screen respectively. In order to accommodate the vertical viewing offset, a linear vertical fresnel can be offset in the required direction, while the horizontal fresnel remains centered. A drawback is that the brightness of the screen is higher near the top of the screen than near the bottom.

A conventional fresnel is symmetrical about its center (whether or not the center is offset on the screen). According to a further inventive aspect, the vertical fresnel can vary in focal length at different rates proceeding upwardly from the center than downwardly. A modestly different focal length at the top and the bottom of the screen balances the difference in brightness caused by vertically offsetting the center point of the fresnel, providing more uniform brightness.

According to a further inventive aspect, differences in center to edge brightness are balanced by corresponding variations in gain in holographic screen element 26. The following measurements were made to compare the center and edge brightness of two holographic screens having respective nonvarying gain of 14.8 and 22.5, with a holographic screen that had a gain of 14.8 at the center and 22.5 at the edges. The points are identified using clock face numbering to distinguish the edge points as to the major and minor axis, and the brightness measurements W are in footcandles.

EXAMPLE 1,

Nonvarying Holographic Gain 14.8

| Point | W | % of Ctr | Means |
|---|---|---|---|
| ctr | 115.9 | 100.00 | Major Axis |
| 3 | 22.1 | 27.70 | 25.19 |

-continued

| Point | W | % of Ctr | Means |
|---|---|---|---|
| 9 | 26.3 | 22.69 | Minor Axis |
| 6 | 38.1 | 32.87 | 39.52 |
| 12 | 53.5 | 46.16 | Corner |
| 2 | 11.7 | 10.09 | 7.74 |
| 4 | 8.3 | 7.16 | |
| 8 | 6.4 | 5.52 | |
| 12 | 9.5 | 8.20 | |

EXAMPLE 2,
Nonvarying Holographic Gain 22.5

| Point | W | % of Ctr | Means |
|---|---|---|---|
| ctr | 172.7 | 100.00 | Major Axis |
| 3 | 55.8 | 32.31 | 28.84 |
| 9 | 43.8 | 25.36 | Minor Axis |
| 6 | 63.3 | 36.65 | 41.40 |
| 12 | 79.9 | 46.15 | Corner |
| 2 | 18.6 | 10.77 | 8.31 |
| 4 | 13.3 | 7.70 | |
| 8 | 10.8 | 6.25 | |
| 12 | 14.7 | 8.51 | |

EXAMPLE 3
Varying Holographic Gain 14.8 at Center and 22.5 at Edge

| Point | W | % of Ctr | Means |
|---|---|---|---|
| ctr | 115.9 | 100.00 | Major Axis |
| 3 | 55.8 | 48.14 | 42.97 |
| 9 | 43.8 | 37.79 | Minor Axis |
| 6 | 63.3 | 54.62 | 61.69 |
| 12 | 79.7 | 68.77 | Corner |
| 2 | 18.6 | 16.05 | 12.38 |
| 4 | 13.3 | 11.48 | |
| 8 | 10.8 | 9.32 | |
| 12 | 14.7 | 12.68 | |

From the foregoing examples it can be seen that as a matter of proportions and considering the average brightness at opposite edges, varying the gain of the holographic screen in this matter produces a bright improvement on the edges of the major axis (3 and 9 o'clock) of 72%, measured as the improvement in edge brightness as a proportion of center brightness, minor axis edge improvement (6 and 12 o'clock) of 55%, and extreme corner improvement of 50%.

The forgoing center to edge variations are useful individually and in combinations, and can be embodied, for example, as multiple layer screens.

What is claimed is:

1. A projection television, comprising:

a plurality of image projectors for respective images of different colors;

a projection screen formed by superimposing linear Fresnel lenses having mutually perpendicular optical active axes and a three-dimensional hologram forming a lenticular lens, said screen receiving images from said projectors on a first side and displaying said images on a second side with controlled light dispersion of said displayed images; and, said screen forming an interference array with optical properties varying differently from one another horizontally and vertically across a field of view due to said mutually perpendicular optical active axes of said linear Fresnel lenses, said optical properties varying in at least one of holographic gain, collimation and centering, wherein the hologram and the Fresnel lenses have optical properties that vary between a center point of the superimposed Fresnel lenses and edges of the screen.

2. The projection television of claim 1, wherein the center point of the superimposed Fresnel lenses corresponds with a center of the screen.

3. The projection television of claim 1, wherein the center point of the superimposed Fresnel lenses is displaced vertically from the center of the screen.

4. The projection television of claim 1, wherein the optical properties of the hologram and the Fresnel lenses vary differently from one another between the center of the superimposed Fresnel lenses and the edges of the screen.

5. The projection television of claim 1, wherein the Fresnel lenses are centered horizontally and displaced vertically with respect to the center of the screen.

6. The projection television of claim 1, wherein the hologram has an increasing gain proceeding from the center point of the hologram toward the edges.

7. The projection television of claim 6, wherein the gain varies between approximately 14.8 at the center point and 22.5 at least at the edges in one of a vertical and a horizontal plane.

8. The projection television of claim 6, wherein the gain varies from the center point toward the edges in a pattern corresponding to an aspect ratio of the screen.

9. The projection television of claim 6, wherein the center point corresponds to a center of the screen.

10. The projection television of claim 6, wherein the center point is displaced vertically from a center of the screen.

* * * * *